United States Patent
Bieniek et al.

(10) Patent No.: US 11,117,585 B2
(45) Date of Patent: Sep. 14, 2021

(54) METHOD FOR DRIVE OPTIMIZATION IN A MOTOR VEHICLE

(71) Applicant: Robert Bosch GmbH, Stuttgart (DE)

(72) Inventors: Lars Bieniek, Schwäbisch Hall (DE); Martin Nordmann, Oberstenfeld-Gronau (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/870,403

(22) Filed: May 8, 2020

(65) Prior Publication Data
US 2020/0391748 A1 Dec. 17, 2020

(30) Foreign Application Priority Data

Jun. 12, 2019 (DE) .................. 102019208538.5
Feb. 26, 2020 (DE) .................. 102020202462.6

(51) Int. Cl.
| | | |
|---|---|---|
| *B60W 40/10* | (2012.01) | |
| *B60W 30/18* | (2012.01) | |
| *B60W 10/04* | (2006.01) | |
| *B60K 17/34* | (2006.01) | |

(52) U.S. Cl.
CPC ....... *B60W 30/18172* (2013.01); *B60K 17/34* (2013.01); *B60W 10/04* (2013.01); *B60W 30/18109* (2013.01); *B60W 40/10* (2013.01)

(58) Field of Classification Search
None
See application file for complete search history.

(56) References Cited

U.S. PATENT DOCUMENTS

| | | | | |
|---|---|---|---|---|
| 5,388,658 A | * | 2/1995 | Ando .................. | B60K 23/0808 180/197 |
| 6,575,261 B2 | * | 6/2003 | Mori .................... | B60K 23/0808 180/197 |
| 7,857,085 B2 | * | 12/2010 | Spark .................. | B62D 1/12 180/236 |
| 8,073,608 B2 | * | 12/2011 | Hulten ................. | B62D 6/003 701/91 |
| 8,825,295 B2 | * | 9/2014 | Turner ................. | B62D 15/0245 701/41 |
| 9,969,424 B2 | * | 5/2018 | Guy ..................... | B62D 6/00 |
| 10,926,794 B2 | * | 2/2021 | Murayama ........... | B62D 6/003 |
| 2020/0156607 A1 | * | 5/2020 | Ueno .................... | B60W 40/12 |
| 2020/0247394 A1 | * | 8/2020 | Arima .................. | B60W 10/20 |

FOREIGN PATENT DOCUMENTS

| | | |
|---|---|---|
| DE | 102004046008 A1 | 3/2006 |
| DE | 102005040253 B3 | 5/2007 |

\* cited by examiner

*Primary Examiner* — Dirk Wright
(74) *Attorney, Agent, or Firm* — Norton Rose Fulbright US LLP; Elizabeth Tretter

(57) ABSTRACT

In a method for drive optimization in a motor vehicle including at least two drivable wheels at a vehicle axle having individually settable drive torque, to increase the propelling force, the drive torque at at least one wheel is increased in such a way that an increased longitudinal slip of at least 20% results at the wheel.

12 Claims, 2 Drawing Sheets

METHOD FOR DRIVE OPTIMIZATION IN A MOTOR VEHICLE

CROSS REFERENCE

The present application claims the benefit under 35 U.S.C. § 119 of German Patent Application No. DE 102019208538.5 filed on Jun. 12, 2019 and German Patent Application No. DE 102020202462.6 filed on Feb. 26, 2020, which are each incorporated by reference it its entirety.

FIELD

The present invention relates to a method for drive optimization in a motor vehicle, which is equipped with at least two drivable wheels at a vehicle axle, an individually settable drive torque being applicable at the wheels.

BACKGROUND INFORMATION

A motor vehicle including permanently driven rear axle and optionally connectable front axle is described in German Patent Application No. DE 10 2004 046 008 A1, the yaw moment of the vehicle being oriented to a setpoint yaw moment by individually driving the front wheels. In addition, individual wheels may be decelerated if the desired setpoint yaw moment may not be provided solely by the drive torque at the front wheels.

A differential arrangement including variable torque distribution in the drivetrain of a motor vehicle is described in German Patent No. DE 10 2005 040 253 B3. The differential arrangement may be designed as a center differential or an axle differential.

SUMMARY

An example method according to the present invention is used for drive optimization in a motor vehicle, which includes at least two drivable wheels at opposing sides of a shared vehicle axle, an individually settable drive torque being applicable at the drivable wheels. It is accordingly possible to apply both an equal drive torque and also a drive torque of different levels at the opposing wheels of the same vehicle axle.

To increase the propelling force, an increased longitudinal slip is generated at at least one drivable wheel by a corresponding setting of the drive torque. The increased longitudinal slip has the advantage that the affected wheel rotates faster than it matches the kinematic rolling condition. This spinning of the wheel results in a removal of the uppermost layer of the ground on which the wheel is located, a subsurface having a higher friction coefficient being located below the uppermost layer with a certain probability. With the removal of the uppermost layer, the wheel comes into contact with the subsurface located underneath. If the subsurface has a higher friction coefficient, the drive torque may accordingly be transferred better or possibly completely to the ground, so that a higher propelling force is also achieved in the longitudinal direction of the vehicle.

Individually or in combination with the increased longitudinal slip, an interlocking effect of the tire profile of the affected wheel with the ground may have the effect that in addition to a friction lock or partial friction lock, a form fit is also achieved, which enables a higher propelling force of the vehicle. Moreover, a support effect comes into consideration by the driven wheel working into a loose subsurface due to the high longitudinal slip, the lateral support of the wheel on the ground, the traction only still being applied for a higher propelling force in the longitudinal direction. The wheel pressing laterally into the ground no longer requires a transverse force to be applied via the traction, but rather may convert the traction completely into the longitudinal force and thus into the propulsion (circle of forces).

A recoil effect may be achieved due to the high longitudinal slip, in that loose subsurface is thrown to the rear due to the spinning of the driven wheel.

The example method additionally takes into consideration the locked steering angle in the vehicle as a boundary condition. At one or multiple vehicle wheels, the torque is applied in such a manner that the actual vehicle movement at least approximately follows the locked steering angle. The applied torque is a drive torque or a braking torque. It may be sufficient to apply a torque at only one vehicle wheel or at multiple wheels, possibly at all wheels. Furthermore, it is possible to modify the torque—with a time offset—at that wheel at which the increased longitudinal slip is generated, and also alternatively or cumulatively to modify the torque at at least one further wheel which does not have increased longitudinal slip. In one preferred embodiment, the drive torque is modified at the wheel having an increased longitudinal slip. This is carried out using a time offset to ensure that initially an increased longitudinal slip is active to remove the uppermost layer of the subsurface on which the wheel is presently located and/or to effectuate a digging-in or a support. If no intervention is made at the wheel driven using an increased longitudinal slip, the torque at another wheel may be modified at the same time or with a time offset in relation to the wheel driven using an increased longitudinal slip.

The longitudinal slip is increased by a significant amount. According to a first advantageous embodiment of the present invention, it is provided that the increased longitudinal slip is at least 20%. This value ensures that with most types of subsurface, the longitudinal slip at the affected wheel is situated in the friction coefficient-slip diagram significantly above the friction coefficient maximum and thus in the nonlinear range outside the typical linear control range of the friction coefficient-slip diagram. This procedure has the advantage that due to the high longitudinal slip by the removal of the uppermost layer of the subsurface, a layer located underneath having a higher friction coefficient may be reached, which corresponds to a radius increase of the so-called circle of forces, which represents the maximum of transferable wheel longitudinal force and wheel transverse force. The friction coefficient increase due to the removal of the uppermost layer of the subsurface thus effectuates both an increased propelling force acting in the longitudinal direction and an increased transverse force, which improves the steerability.

According to a further aspect of the present invention, the increase of the longitudinal slip is carried out to a value above the friction coefficient maximum in the friction coefficient-slip diagram. In this case as well, the applied longitudinal slip, which is generated by the drive torque at at least one wheel, is outside the typical linear control range of the friction coefficient-slip diagram and is beyond the friction coefficient maximum in a nonlinear range of the p-slip curve. The increased longitudinal slip has the above-described consequences as a result and increases the probability that the affected wheel will reach an subsurface including an increased friction coefficient and/or experiences an increased friction coefficient in any other way, whereby accordingly a radial expansion of the circle of forces and an increase of the propelling force with improved steerability at the same time is effectuated.

According to one advantageous refinement of the present invention, the increased longitudinal slip is maintained for a minimum period. This ensures that a minimum of removal of the uppermost layer of the subsurface and/or a minimum of interlocking effect or burrowing into the loose subsurface is achieved. For example, it may be advantageous for the increased longitudinal slip to remain set until the affected wheel has an increased friction coefficient in relation to the subsurface.

According to another advantageous embodiment of the present invention, the increased longitudinal slip is maintained for a maximum period, if no increase of the friction coefficient is established. This maximum limit with respect to time ensures that the longitudinal slip is reduced again, for example, to a value in the linear range of the friction coefficient-slip diagram, if the removal of the uppermost layer does not result in the desired increase of the friction coefficient.

According to another advantageous embodiment of the present invention, the increased longitudinal slip and its modification is carried out at one or multiple of the wheels in a speed-regulated manner.

The example method in accordance with the present invention is applicable both to motor vehicles having two driven wheels at only one axle and to four-wheel drive vehicles, in which an individually settable drive torque is applicable at all wheels in the case of driving.

According to another advantageous embodiment of the present invention, the vehicle velocity is taken into consideration as a further boundary condition upon the application of the increased longitudinal slip. The longitudinal slip is modified in such a way that the vehicle actual velocity at least approximately follows a predefined vehicle setpoint velocity. The modification of the longitudinal slip may be carried out either at the same time as the increase of the longitudinal slip or with a time offset.

The increased longitudinal slip to be set at the at least one wheel may possibly also have a value higher than 20%, for example, 30%, 40%, 50%, or more, in particular up to 100%. Gradations in small increments of, for example, 1% are possible.

Various possibilities come into consideration for triggering the method and setting the increased longitudinal slip. For example, the longitudinal slip is increased in the cases in which the deviation of the vehicle actual velocity from the predefined vehicle setpoint velocity exceeds a permissible value. This case indicates that the friction coefficient between the wheels and the subsurface is comparatively low and is not sufficient to implement the desired propulsion, for example, in the case of a snow-covered roadway, on gravel or sand, and/or during an uphill drive. In these cases, the method according to the present invention may be started to remove the uppermost layer of the subsurface and/or reach an increased friction coefficient in any other way. The starting of the method is preferably carried out automatically, manual starting alternatively also coming into consideration.

The present vehicle condition is detected via a sensor system, for example, an inertial sensor system for detecting the longitudinal and transverse acceleration and the yaw rate of the vehicle. The sensor system may additionally include wheel speed sensors and a steering angle sensor and possibly sensors for detecting the accelerator pedal position or drive torque request and for the braking torque request.

The present invention furthermore relates to a control unit for activating at least one drive unit in a motor vehicle to carry out the above-described method. The drive unit is a drive engine, which is optionally connected to a transmission, in any case, two opposing wheels on a shared vehicle axle being individually activatable. For example, a center drive engine comes into consideration, whose drive torque may be allocated via a converter and distributor transmission into an individually controllable drive torque at the opposing wheels of the same vehicle axle, the drive torque at each wheel being between 0% and 100% of the maximum value. The drive motor is an electric motor or an internal combustion engine. Alternatively to a center drive engine, electrical motors close to the wheel and individual to the wheel come into consideration, for example, wheel hub motors.

The present invention additionally relates to a computer program product having a program code which is designed to carry out the above-described method steps. The computer program product runs in an above-described control unit.

Further advantages and advantageous embodiments may be inferred from the description herein and the figures.

DETAILED DESCRIPTION OF EXAMPLE EMBODIMENTS

Figure 1:
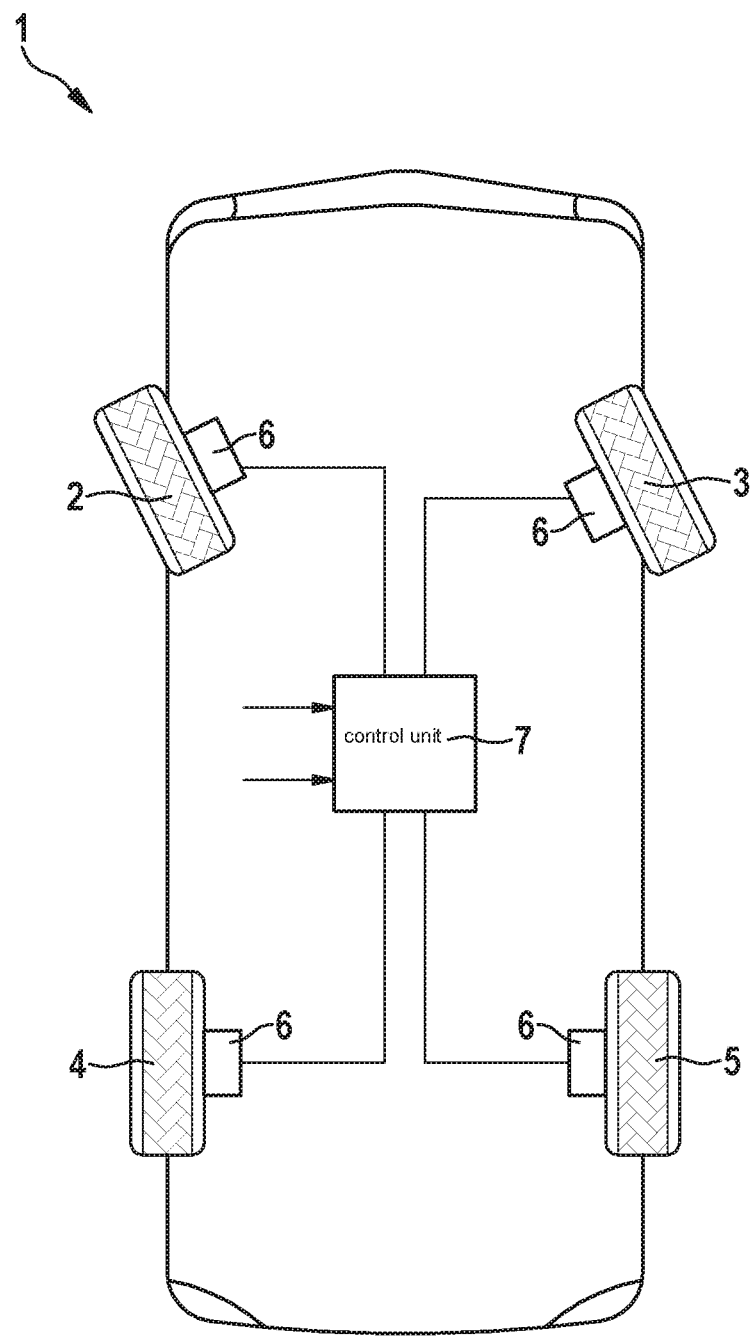
FIG. 1 shows a schematic view of a motor vehicle, which is equipped as a four-wheel drive vehicle with wheel-specific motors.

A motor vehicle 1 is shown in FIG. 1, which is designed as a four-wheel drive vehicle and includes a wheel-specific motor 6 designed as an electric motor in each case at each wheel 2, 3, 4, 5. Accordingly, each wheel 2 through 5 is activatable individually via its associated electric motor 6. The activation is carried out via a control unit 7, to which items of sensor information may be supplied, for example, from an inertial sensor system for detecting the longitudinal and transverse acceleration and the yaw rate of the vehicle. In addition, wheel speed signals of wheels 2 through 5 and steering angle signals and possibly the accelerator pedal position or torque request are transmitted to control unit 7.

In accordance with an example embodiment of the present invention, to increase the propelling force, it is appropriate in certain situations to set an increased longitudinal slip at one or multiple of the driven wheels by increasing the drive torque. For example, if the vehicle actual velocity falls short of the vehicle setpoint velocity by a defined amount, this may thus indicate a lower friction coefficient between the wheels and the subsurface. Depending on the subsurface composition, it may be advantageous to remove the uppermost layer of the subsurface by way of the increased longitudinal slip and, accompanying this, spinning of the driven wheel or wheels, in order to expose an underlying layer having an increased friction coefficient. Digging of the wheel running with longitudinal slip into the subsurface and support effects as a result of the digging may also result in an improvement of the propulsion.

The increased longitudinal slip is set by activating at least one wheel 2 through 5 by the associated wheel-specific motor 6. The longitudinal slip is advantageously at least 20% and in any case is above the friction coefficient maximum in the friction coefficient-slip diagram.

Figure 3:
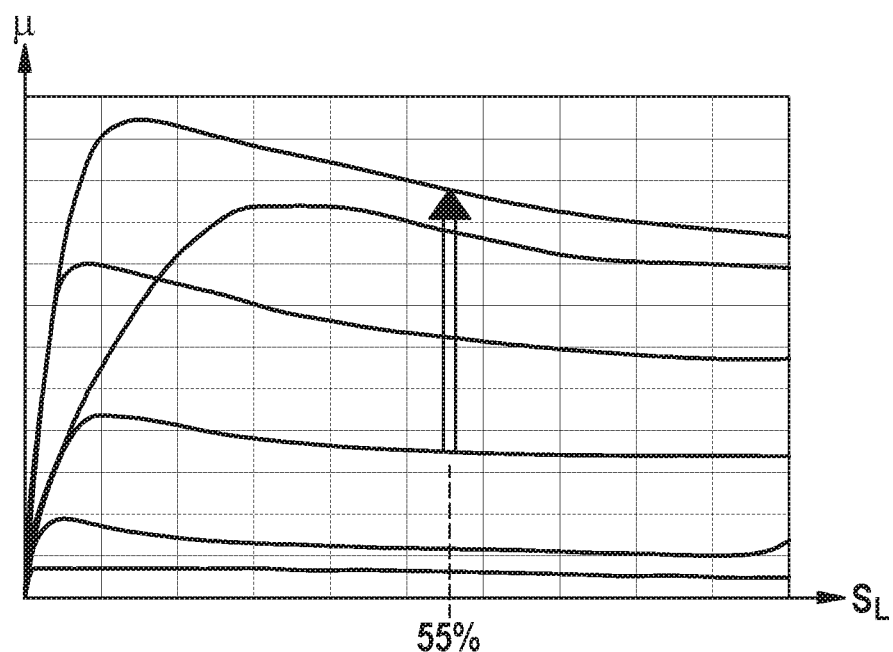
FIG. 3 shows a diagram including various friction coefficient-slip curves.

In FIG. 3, such a friction coefficient-slip diagram is shown including various p-slip curves for different types of subsurface. Overall, five p-slip curves are plotted in the diagram, the lower curve applying for subsurface having a low friction coefficient, for example, for snow, and the uppermost curve for dry asphalt having a high friction coefficient. All curves share the feature that after an initial linear increase, a maximum is reached and friction coefficient p drops again after exceeding the maximum with increasing slip. In the example method according to the present invention, a longitudinal slip $s_L$ is set, which is above or beyond the friction coefficient maximum in the falling branch. In FIG. 3, a longitudinal slip $s_L$ of 55% is plotted by way of example, which is applied to one or multiple driven wheels by a corresponding increase of the drive torque. Due to the mentioned effects such as removal of the uppermost layer and digging into the subsurface, in the exemplary embodiment, a significant increase of friction coefficient p is achieved from the second lowermost curve to the uppermost curve.

Figure 2:
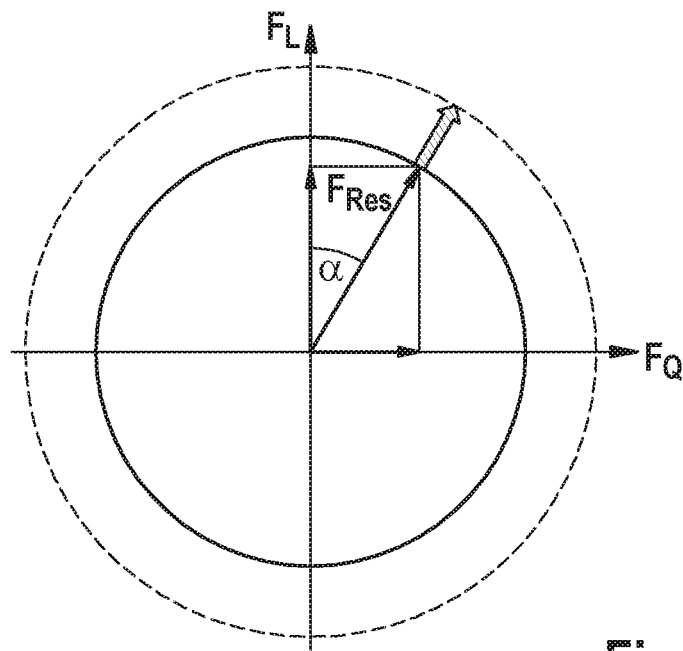
FIG. 2 shows a longitudinal force-lateral force diagram including a circle of forces.

FIG. 2 shows a diagram including wheel longitudinal force $F_L$ over wheel transverse force $F_Q$ in the circle of forces. The circle drawn with a solid line identifies the present friction coefficient, and the dashed circle, which has a larger radius, represents the increase due to the described measure of the increased longitudinal slip and, accompanying this, achieving an increased friction coefficient. Accordingly, the wheel longitudinal force as well as the wheel lateral force and the lateral guiding are increased.

The increase of the longitudinal slip is under the boundary condition that the vehicle movement at least approximately follows the locked steering angle, which is ascertained from a comparison of the locked steering angle to the curved path of the vehicle actually carried out, which is determined in particular on the basis of the present yaw rate of the vehicle.

The actual vehicle movement is to be within a definable tolerance range in relation to the setpoint track, which results due to the locked steering angle.

If it is determined that the vehicle movement is outside the tolerance range in relation to the setpoint track, the longitudinal slip may be set to a smaller amount. Cases are certainly possible in which the longitudinal slip is limited from the beginning to a defined maximum amount in order to ensure the steerability of the vehicle, and also cases in which initially the longitudinal slip is set to a high value and subsequently it is reduced again to ensure the steerability. In a further alternative, it is also possible to maintain a high set longitudinal slip and to apply a drive torque or braking torque to one or multiple vehicle wheels in order for the vehicle to be in the desired setpoint track. This procedure has the advantage that the desired longitudinal slip may be set at one or multiple vehicle wheels to remove the uppermost layer, and at the same time yaw moments resulting in the vehicle are compensated for by the targeted application of drive torques or braking torques at further vehicle wheels.

The increased longitudinal slip may be reduced again, in particular in the linear range of the p-slip diagram, if it is established that the vehicle is located on a subsurface having a higher friction coefficient. Alternatively, it is also possible to end the increased longitudinal slip if an increased friction coefficient does not result after a predefined time span has elapsed.

What is claimed is:

1. A method for drive optimization in a motor vehicle including at least two drivable wheels at a vehicle axle, an individually settable drive torque being applicable at the drivable wheels, the method comprising:
   increasing a drive torque at at least one wheel of the vehicle in such a way that an increased longitudinal slip of at least 20% results at the at least one wheel, to increase a propelling force; and
   modifying, at the same time as the increasing step or with a time offset relative to the increasing step, a drive torque or braking torque at one or more wheels of the vehicle in such a way that a vehicle movement at least approximately follows a locked steering angle.

2. A method for drive optimization in a motor vehicle including at least two drivable wheels of a vehicle axle, an individually settable drive torque being applicable at the drivable wheels, the method comprising:
   increasing a drive torque at at least one wheel of the vehicle in such a way that a longitudinal slip at the at least one wheel in a friction coefficient-slip diagram assumes an increased value above a friction coefficient maximum, to increase a propelling force; and
   modifying, at the same time as the increasing step or with a time offset relative to the increasing step, a drive torque or braking torque at one or more wheels of the vehicle in such a way that a vehicle movement at least approximately follows a locked steering angle.

3. The method as recited in claim 1, wherein the increased longitudinal slip is maintained for a minimum period.

4. The method as recited in claim 1, wherein the increased longitudinal slip remains set until the at least one wheel has an increased friction coefficient in relation to a subsurface.

5. The method as recited in claim 1, wherein the increased longitudinal slip is maintained for a maximum period if a friction coefficient in relation to a subsurface does not increase.

6. The method as recited in claim 1, wherein the motor vehicle is a four-wheel drive vehicle and an individually settable drive torque is applicable at all wheels in the case of driving.

7. The method as recited in claim 1, wherein the longitudinal slip is modified in such a way that the vehicle actual velocity at least approximately follows a predefined vehicle setpoint velocity.

8. The method as recited in claim 1, wherein a longitudinal slip of up to 100% is set at least temporarily at at least one drivable wheel of the vehicle.

9. The method as recited in claim 1, wherein the increase of the longitudinal slip is generated when a deviation of an actual velocity of the vehicle from a vehicle setpoint velocity exceeds a permissible value.

10. A control unit for drive optimization in a motor vehicle including at least two drivable wheels at a vehicle axle, an individually settable drive torque being applicable at the drivable wheels, the control unit configured to:
    activate at least one drive unit in the vehicle to increase a drive torque at at least one wheel of the vehicle in such a way that an increased longitudinal slip of at least 20% results at the at least one wheel, to increase a propelling force; and
    modify, at the same time as the activating or with a time offset relative to the increasing step, a drive torque or braking torque at one or more wheels of the vehicle in such a way that a vehicle movement at least approximately follows a locked steering angle.

11. A vehicle, comprising:
    at least one drive unit;
    at least two separately drivable wheels on a vehicle axle; and a control unit configured to:
    activate the at least one drive unit in the vehicle to increase a drive torque at at least one wheel of the vehicle in such a way that an increased longitudinal slip of at least 20% results at the at least one wheel, to increase a propelling force; and
    modify, at the same time as the activating or with a time offset relative to the increasing step, a drive torque or braking torque at one or more wheels of the vehicle in such a way that a vehicle movement at least approximately follows a locked steering angle.

12. A non-transitory machine-readable medium on which is stored a computer program having program code for drive optimization in a motor vehicle including at least two drivable wheels at a vehicle axle, an individually settable drive torque being applicable at the drivable wheels, the program code, when executed by a control unit, causing the control unit to perform:
    increasing a drive torque at at least one wheel of the vehicle in such a way that an increased longitudinal slip of at least 20% results at the at least one wheel, to increase a propelling force; and
    modifying, at the same time as the increasing step or with a time offset relative to the increasing step, a drive torque or braking torque at one or more wheels of the vehicle in such a way that a vehicle movement at least approximately follows a locked steering angle.

\* \* \* \* \*